(12) United States Patent
Bright-Thomas

(10) Patent No.: US 10,182,248 B2
(45) Date of Patent: Jan. 15, 2019

(54) KEYFRAME MITIGATION FOR VIDEO STREAMS WITH MULTIPLE RECEIVERS

(71) Applicant: Cisco Technology, Inc., San Jose, CA (US)

(72) Inventor: Paul G. Bright-Thomas, Wokingham (GB)

(73) Assignee: Cisco Technology, Inc., San Jose, CA (US)

( * ) Notice: Subject to any disclaimer, the term of this patent is extended or adjusted under 35 U.S.C. 154(b) by 92 days.

(21) Appl. No.: 15/357,066

(22) Filed: Nov. 21, 2016

(65) Prior Publication Data
US 2018/0146221 A1    May 24, 2018

(51) Int. Cl.
| | |
|---|---|
| *H04N 7/173* | (2011.01) |
| *H04N 21/2365* | (2011.01) |
| *H04N 19/51* | (2014.01) |
| *H04N 21/234* | (2011.01) |
| *H04N 21/24* | (2011.01) |
| *H04N 21/6379* | (2011.01) |

(Continued)

(52) U.S. Cl.
CPC ......... *H04N 21/2365* (2013.01); *H04N 19/46* (2014.11); *H04N 19/51* (2014.11); *H04N 19/65* (2014.11); *H04N 19/895* (2014.11); *H04N 21/234* (2013.01); *H04N 21/2407* (2013.01); *H04N 21/6379* (2013.01)

(58) Field of Classification Search
CPC .... H04N 21/235; H04N 21/435; H04N 19/46; H04N 19/61
See application file for complete search history.

(56) References Cited

U.S. PATENT DOCUMENTS

| | | | |
|---|---|---|---|
| 6,281,929 B1 * | 8/2001 | Fimoff | H04N 17/004 348/180 |
| 7,136,394 B2 | 11/2006 | Horowitz et al. | |

(Continued)

OTHER PUBLICATIONS

International Search Report and Written Opinion in corresponding International Application No. PCT/US2017/061673, dated Feb. 2, 2018, 15 pages.

(Continued)

*Primary Examiner* — Gigi L Dubasky
(74) *Attorney, Agent, or Firm* — Edell, Shapiro & Finnan, LLC

(57) ABSTRACT

In one embodiment, a video encoder generates an encoded bitstream representing a sequence of video frames including a keyframe. The encoder generates information for use by a decoder that receives the encoded bitstream to enable the decoder to generate display frames from a pre-keyframe video frame that is prior to the keyframe in the sequence of video frames. The encoded bitstream is sent to the decoder. In another embodiment, a video decoder receives from an encoder an encoded bitstream representing a sequence of video frames including a keyframe. The keyframe includes information to enable the decoder to generate display frames from a pre-keyframe video frame that was received prior to the keyframe in the sequence of video frames. The decoder generates display frames using the pre-keyframe video frame, information included with the keyframe and information included with an encoder-determined number of decoded frames subsequent to the keyframe.

20 Claims, 8 Drawing Sheets

(51) Int. Cl.
    *H04N 19/46*     (2014.01)
    *H04N 19/65*     (2014.01)
    *H04N 19/895*     (2014.01)

(56) References Cited

U.S. PATENT DOCUMENTS

| | | |
|---|---|---|
| 8,731,152 B2 | 5/2014 | Lee et al. |
| 9,112,147 B2 | 8/2015 | Raveendran et al. |
| 2002/0116715 A1* | 8/2002 | Apostolopoulos ...... H04L 29/06 725/86 |
| 2008/0260047 A1 | 10/2008 | Hannuksela et al. |
| 2013/0039424 A1 | 2/2013 | Le Floch et al. |
| 2013/0223524 A1 | 8/2013 | Lu et al. |
| 2014/0010290 A1* | 1/2014 | Rapaka ................ H04N 19/105 375/240.12 |

OTHER PUBLICATIONS

Raychaudhuri, et al., "ATM Transport and Cell-Loss Concealment Techniques for MPEG Video", IEEE International Conference on Acoustics, Speech, and Signal Processing (ICASSP), DOI: 10.1109/ICASSP.1993.319069, Apr. 27, 1993, 4 pgs.

\* cited by examiner

KEYFRAME MITIGATION FOR VIDEO STREAMS WITH MULTIPLE RECEIVERS

TECHNICAL FIELD

The present disclosure relates to video coding.

BACKGROUND

Keyframes are added to video streams to begin a stream, to change key properties (like resolution), to resynchronize after loss, or to allow additional receivers to start consuming the stream. Keyframes are free of dependency on other frames in the video sequence, and in doing so, are restricted to a subset of compression techniques, which cannot achieve the same degree of compression efficiency as inter-frame dependency. In low-latency channels with constrained bandwidth, the size of a keyframe is to be kept comparable with the typical frame, or it cannot be delivered without delay. This leads to low-quality keyframes that are degraded in quality relative to typical frames. In low-latency bi-directional video communication, keyframes are usually sent when requested by an existing or new recipient.

The requestor of the keyframe is often not as sensitive to this loss of quality as others who are consuming the stream. When the Nth participant starts to consume a stream shared with others, that participant starts from nothing and is little affected by the low quality of the first frame. But the N−1 participants already viewing the stream will see a short-term loss of quality, caused by the keyframe. Similarly, a participant who has experienced packet loss, will see a broken stream (if not concealed by freezing) repaired by an eventual keyframe that is requested. Other participants will experience a temporary degradation, with no gain.

DESCRIPTION OF EXAMPLE EMBODIMENTS

Overview

In one embodiment, a video encoder generates an encoded bitstream representing a sequence of video frames including a keyframe. The encoder generates information for use by a decoder that receives the encoded bitstream to enable the decoder to generate display frames from a pre-keyframe video frame that is prior to the keyframe in the sequence of video frames, and includes the information in the keyframe. The information is included with the keyframe and with an encoder-determined number of frames subsequent to the keyframe.

In another embodiment, a video decoder receives from an encoder an encoded bitstream representing a sequence of video frames including a keyframe. The keyframe includes information to enable the decoder to generate display frames from a pre-keyframe video frame that was received prior to the keyframe. The decoder generates display frames using the pre-keyframe video frame, the information included with the keyframe, and information included with an encoder-determined number of decoded frames subsequent the keyframe.

Detailed Description

Figure 1:
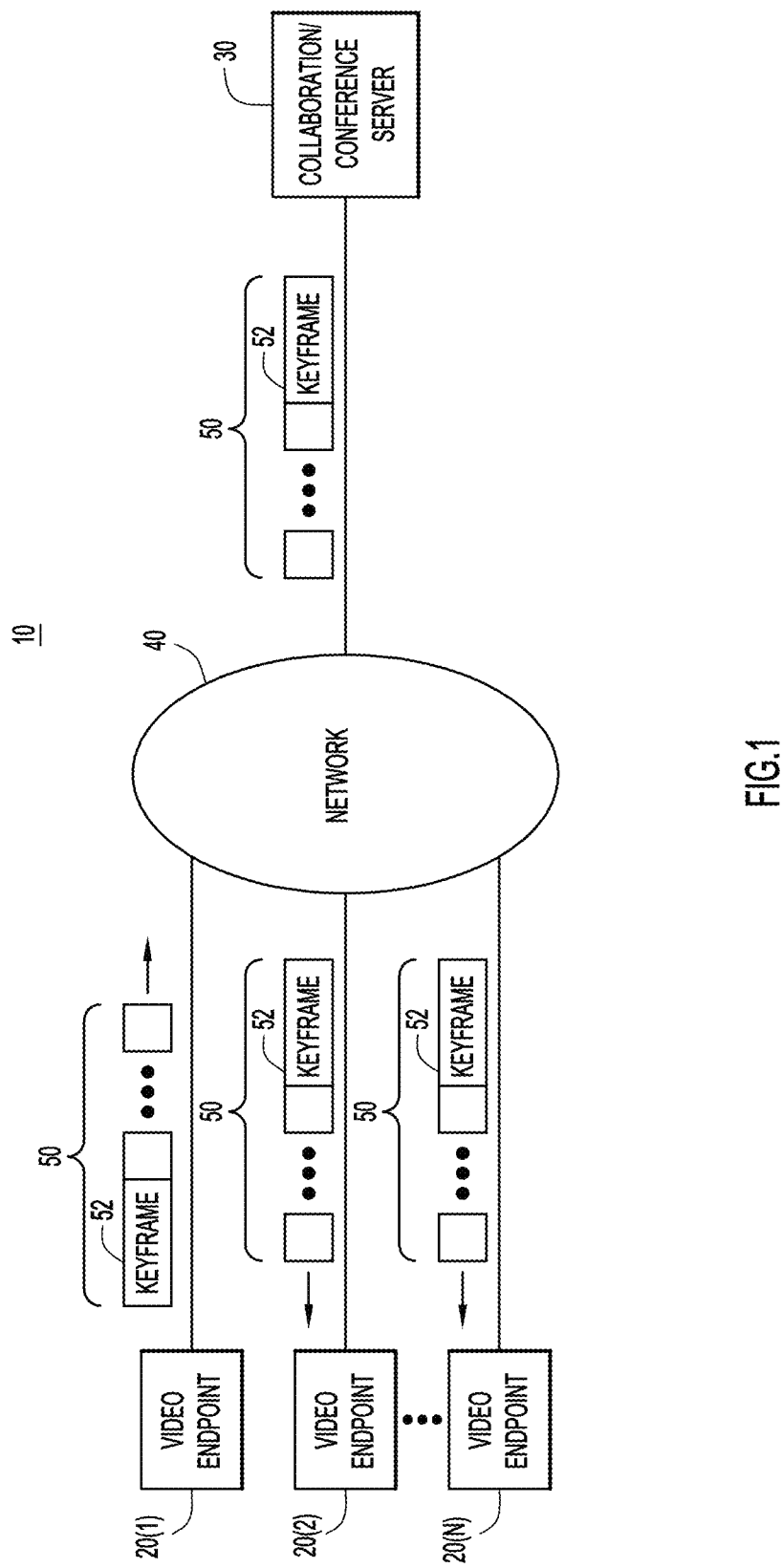
FIG. 1 is a block diagram of a system in which a common video stream is sent to multiple receivers (decoders), such as is the case in a video conference or collaboration session, and in which the keyframe mitigation techniques may be employed, according to an example embodiment.

Reference is first made to FIG. 1. FIG. 1 shows a system 10 in which a plurality of video endpoints 20(1)-20(N) are participating in a session, such as a collaboration or conference session, during which a video stream 50 is sent by the collaboration/conference server 30 over a network 40. The video stream 50 may originate at an encoder within the collaboration/conference server 30, or at an encoder within a transmitting video endpoint (any one of video endpoints 20(1)-20(N)), which sends a stream to the collaboration/conference server 30, to be forwarded to one or more receiving endpoints. For example, as shown in FIG. 1, video endpoint 20(1) may originate the video stream 50 and the collaboration/conference server 30 forwards it to video endpoints 20(2)-20(N). Due to the nature of a real-time collaboration or conference session, the video stream is a low-latency video stream such that the participants/users of the conference/collaboration session see good quality video during the session. The video endpoints 20(1)-20(N) may take the form of desktop computers, laptop computers, tablets, smartphones, video conference endpoint equipment, or any other device now know or hereinafter developed that can participate in a video communication session. The collaboration/conference server 30 may also be forwarding the video stream 50 to further collaboration/conference servers, which each forward the received stream onwards to a set of receiving video endpoints FIG. 1 further shows that video stream 50 may include a keyframe 52. As explained below, keyframe 52 may be generated by the source of the video stream, such as video endpoint 20(1) or the server 30.

Increasingly, low-latency video is supplied to multiple receivers, such as in the application environment depicted in FIG. 1, where switching, and a shared encode resource is employed. Thus, keyframes are useful in some circumstances in video conferencing. They are used incidentally, by receiver request, or by sender decision. The term "keyframe" refers to a frame that is to be decoded for display without reference to any other frame. There are several terms known in the art for "keyframe" including, without limitation, (instantaneous) decoder refresh (IDR) frame, intra-frame (I frame), etc.

Thus, the techniques presented herein involve effectively "breaking" the conventional definition of a keyframe (in which a decoder automatically flushes its memory of prior frames) and instead ownership of the "state" of the video stream is with the encoder, and the encoder informs/controls what the decoder should do when a keyframe is sent to the decoder (for example, not to the "forget" about video frames prior to the keyframe).

Keyframes are also used in broadcasting and streaming usage of video to multiple concurrent receivers, typically inserted at regular intervals to enable a receiver to join the video stream (channel switching) or adaptation of an operating point in sequences pre-encoded video at a range of bitrates (dynamic streaming). Although these applications allow higher latency than bi-directional communication, and thus larger keyframe sizes can be tolerated, encoding keyframes at regular intervals using substantially more bitrate than the typical frame imposes a cost on the overall compression efficiency, which could potentially be mitigated. Thus, the techniques presented herein allow "cheaper" (lower cost) keyframes to be used that is advantageous to overall bitrate.

As mentioned above, conventionally, keyframes enforce "decoder refresh", causing decoders to discard all state, including past frames from which subsequent frames would normally be derived (in non-keyframe coding). Keyframes may be sent at higher rates of incidence, through aggregate rate of request across receivers. For example, keyframes may be used for an entry point (joining a stream), resynchronization after loss of a stream (stream recovery), resolution change (stream resize) including as made necessary or possible by rate adaptation, and change of view (stream view), even if the transport mechanism (e.g., Real-time Transport Protocol (RTP)) is constant. This change of view scenario can arise in selection among multiple possible encoded sources, including in transcoding bridges and multi-camera endpoints. The keyframes will be received by all receivers, even if not required by many of those receivers ("collateral keyframes"), which is the case at an entry point, resynchronization or change of resolution for one (or a subset) of the receivers.

A distinction is made between keyframes received at discontinuity of content (join, view change) and keyframes receiving during continuous content (resync, resolution change, and collateral). The negative impact on user experience from low-quality keyframes is far greater for continuous content than when a receiver detects a substantial change in the scene that is presented to it—visual continuity greatly increases sensitivity. It is therefore highly desirable to mitigate the impact of keyframes on the continuous content experience, by making low-latency keyframes less apparent.

Given multiple receivers and the visual continuity problem above, it is often the case that a receiver has data from before the keyframe that is entirely valid, and could be used to improve the experience at and beyond (subsequent to) the keyframe. Presented herein are techniques that limit the visual impact on lossless receivers of keyframes generated to meet the needs of other receivers in multi-receiver situations, such as multistream video for collaboration/conferencing applications. When a keyframe is generated mid-sequence for a low-latency video stream sent to multiple receivers (e.g., the video endpoints 20(1)-20(N), the visual quality of the video stream across the keyframe event can be improved for most receivers. This can be done by using information from frame(s) before a keyframe to improve the visual quality of the keyframe and subsequent frames, for those receivers that have suitable frames from before the keyframe.

For example, suppose that video endpoint 20(N) has experienced a loss event or joins the conference/collaboration session. In this case, the collaboration server 30 generates a keyframe 52 as part of the bitstream and as a result, the keyframe 52 is sent to all of the video endpoints 20(1)-20(N). While video endpoint 20(N) may use the keyframe to begin generating display data from the video stream, one or more of the other receivers, e.g., video endpoints 20(1), 20(2), etc., may use data associated with one or more frames it received before the keyframe 52 in order to improve the display of the video from the point in time of the keyframe.

Figure 2:
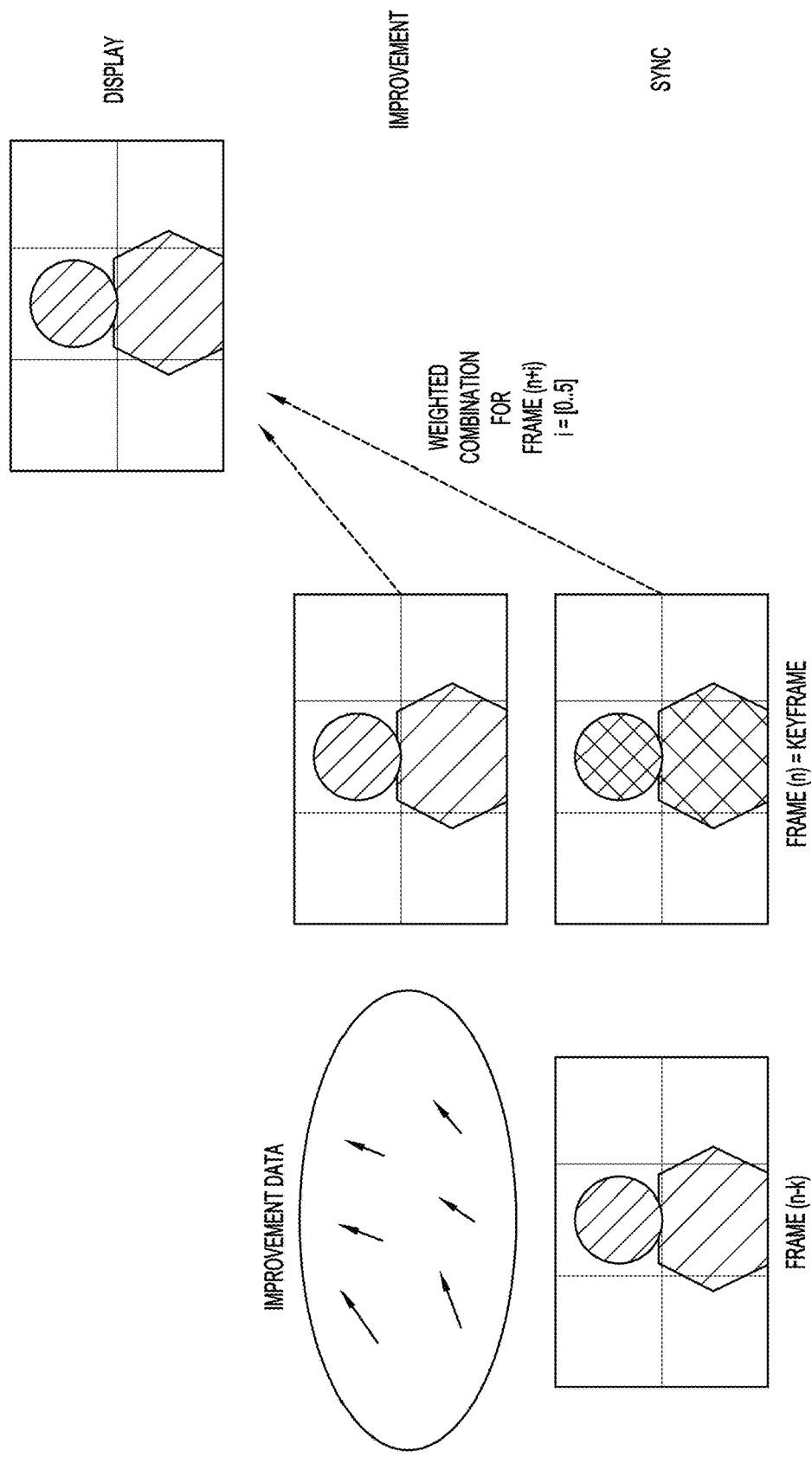
FIG. 2 is a diagram generally depicting the keyframe mitigation techniques, according to an example embodiment.

Reference is now made to FIG. 2. This solution proposes to extend an existing or proposed video compression scheme by the specification of: a) a "sync-layer" that is decoded entirely consistent with the specification of the compression scheme under consideration; b) a "display layer" that some decoders can be assured is fit for display, and is better for usage than the sync-layer; and c) an "improvement layer" that is used to form the display layer, when combined with the sync-layer.

The sync-layer is the bitstream sent from the encoder to the decoder, and in most cases, is governed by a set of rules (e.g., a video codec standard) that are widely applicable in various kinds of receivers. The display layer is derived from the bitstream and is what is shown to a user on a display device. A decoder (at a receiver device) can enhance post-decoded frames to improve/alter what is displayed. The improvement layer is derived from reference data received before the keyframe, and combined with the sync-layer over a small (encoder-determined) number of successive frames including and following the keyframe.

The use of the improvement layer as described herein, to achieve a display layer that provides a better experience than the sync-layer alone, is possible in a situation where some receivers (referred to herein as "enabled receivers") support the improvement and display layer mechanism (in addition to the sync-layer), and some receivers support only the sync-layer (referred to herein as "non-enabled receivers"). Those receivers that support only the sync-layer will get the normal experience of low-quality, low-delay keyframes. The techniques presented herein work in a mixed scenario of enabled-receivers that can perform the keyframe mitigation techniques and non-enabled receivers that cannot. In other words, information is included with a keyframe as supplemental syntax to the keyframe, and information is included each of an encoder-determined number of decoded frames (subsequent to the keyframe) as supplemental syntax to the decoded frames such that both decoders that are capable of interpreting the supplemental syntax and decoders are not capable of interpreting the supplemental syntax can decode the keyframe and the encoder-determined number of decoded frames. This supplemental syntax instructs an enabled-decoder/enabled-receiver to generate improvement layer frames using data contained in the pre-keyframe video frame, and how the decoder is to combine an improvement layer frame with a corresponding decoded frame to produce a display frame.

In FIG. 2, the keyframe (KF) is Frame(n) (fr(n)). Information from a prior frame, e.g., fr(n−k), also referred to herein as a pre-keyframe video frame, is used to generate improvement data to improve apparent continuity for those receivers that have fr(n−k). Those receivers that do not have fr(n−k) can display only what can be generated from the sync-layer.

The new information embodied in the improvement data uses minimal additional bandwidth, to avoid incurring latency in transmission (in which case a higher quality keyframe could have been used). It is included as supplemental syntax to the keyframe and to the encoder-determined number of frames for use temporarily over a limited number of frames (e.g., over 5 to 10 frames), ultimately converging on the sync-layer after those limited number of frames. That is, disp(n+i)−sync(n+i)→0 for i=0 . . . 5 (for example), where disp( ) is display data and sync( ) is the sync-layer (bitstream).

The improvement data may be embodied by subsets of normal P-frame syntax supplemented by a map that indicates whether (a) to apply any improvement in a region/block of a frame (optionally along with weights specified by the encoder) from content of a pre-keyframe video frame, or (b) to use the base-layer of the keyframe as is. In other words, the improvement data is supplemental syntax that indicates to use or not use the improvement, with granularity that ultimately converges to the base-layer (sync-layer) over several frames. The encoder sends this supplemental syntax with a keyframe and with the encoder-determined number of frames subsequent the keyframe. As an example, the new information could be motion compensation relative to fr(n−k). It may be concise; otherwise it expands keyframes and the subsequent frames. The improvement frame imp(n+i) is derived from a frame(n−k) (typically k=1, the frame preceding keyframe, but in the presence of Scalable Video Coding (SVC), it may be a base-layer frame). The frame prior to the keyframe that is used to generate the improvement frame may not be the frame immediately prior to the keyframe. Moreover, more than one frame prior to the keyframe could be used to generate the improvement frames.

The new/supplemental syntax would be added to the keyframe and to the encoder-determined number of frames subsequent the keyframe for "improvement parameters" that are used to generate the "improvement layer" frames as shown in FIG. 2. The improvement layer frame is combined with the sync-layer frame, such as:

$$disp(n+i)=w(i)*sync(n+i)+(1-w(i))*imp(n+i),$$

$$dsp(j)=sync(j) \text{ for } j<n,$$

where w(i) is a weight for the combination of co-located samples in each of the sync-layer and improvement layer frames.

The combination of sync(n+i) and imp(n+i) can be extended in various ways, as described in following examples, including to allow for cases in which imp(i)—which is reliant on reference to an earlier frame sync(n−k)—does not describe content which should be encoded in disp(n+i), such as an object that appears in that frame for the first time.

Coding dependency for reference frames remains at the sync-layer; improvement and display layer frames are only for display, not for reference. The "improvement process" is transient, and on conclusion, receivers will be generating the sync-layer frames, whether they participated in the improvement process or not.

Importantly, this changes decoder reset at keyframes: buffers retain references for improvement-layer use only. Only sync-layer frames may ever retained in the reference buffer, and only frames from the keyframe onwards may be referenced in the reconstruction of a sync-layer frame.

A receiver (decoder) is signaled as to whether to (i) generate a display layer frame, or (ii) display the sync-layer data. That is, a receiver is to be assured it has a correct and exact prior frame from which to enhance/conceal the keyframe. A pre-Instantaneous Decoder Refresh (IDR) reference frame is used to generate a checksum calculated from the sync-layer, and sent with the improvement data. More specifically, the encoder computes a checksum from the pre-keyframe video frame (from which improvement data is to be derived), and the encoder includes this checksum in a video frame that is sent subsequent to the keyframe. A receiver/decoder uses this checksum to ensure that the pre-keyframe video frame is correct/valid before it is used to derive improvement data. Such correctness is usually taken as implicit to any inter-frame dependency, but in this situation inter-frame dependency is specifically applied in a situation known to include packet loss, so the additional security of a checksum is desirable. If the decoder determines that the checksum it computes from the pre-keyframe video frame matches an encoder-calculated checksum (that is sent by the encoder in supplemental syntax with a frame subsequent to the keyframe), then the decoder knows that it should use the display enhancement (that is, it should use the improvement data in relation to the prior frame).

Figure 3:
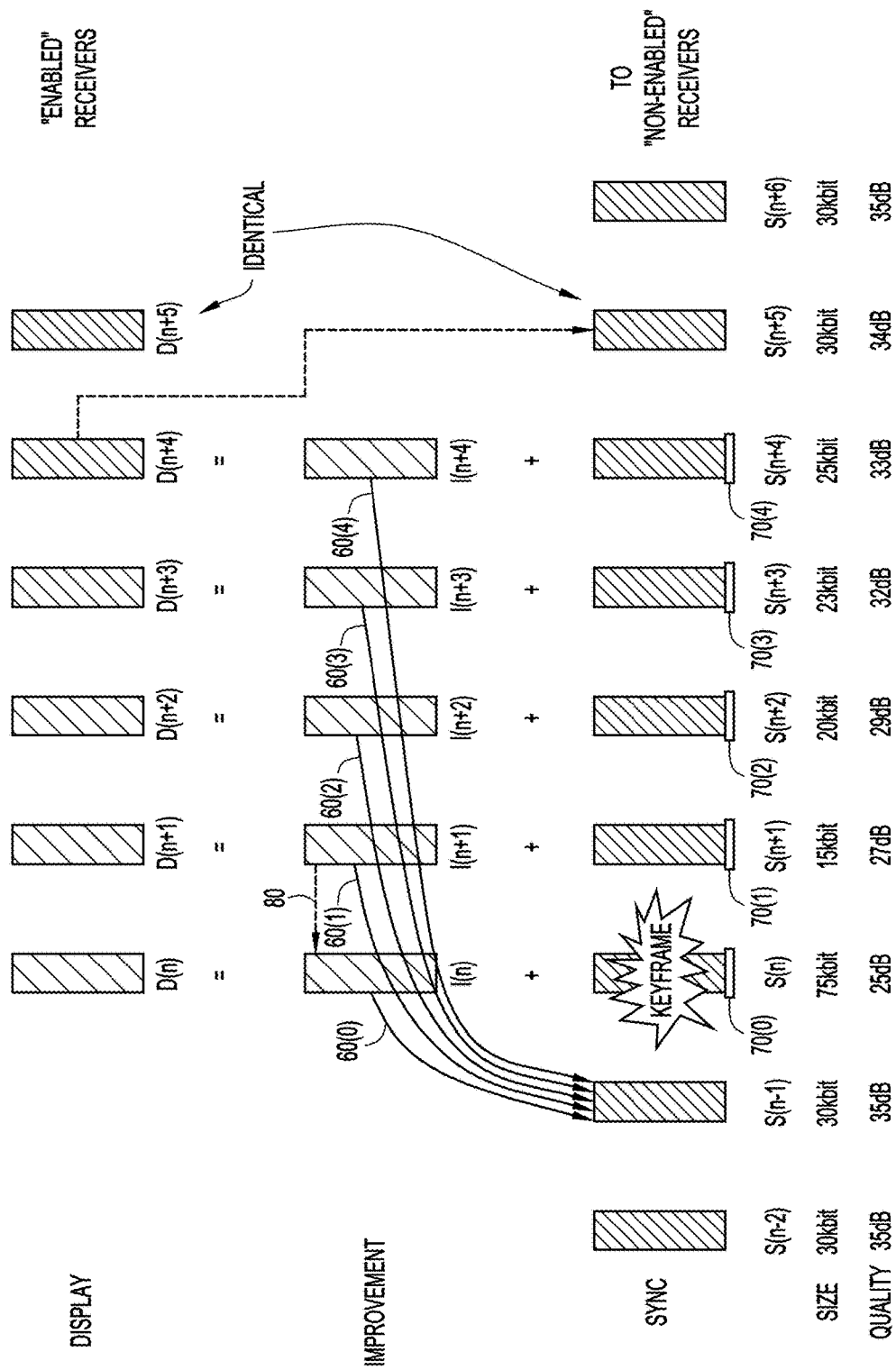
FIG. 3 is a diagram depicting, frame-by-frame, operation of the keyframe mitigation techniques, according to an example embodiment.

Reference is now made to FIG. 3 for a further description of these techniques. FIG. 3 shows a bitstream, the sync-layer, consisting of frames S(n−2), S(n−1), S(n), S(n+1), S(n+2), S(n+3), S(n+4), S(n+5), and S(n+6) at time instances n−2, n−1, n, n+1, n+2, n+3, n+4, n+5 and n+6. A keyframe occurs at time n; frame S(n) is a keyframe. Representative metrics for the encoded size and quality of these frames is indicated in FIG. 3. Notably, the keyframe S(n) is much larger than the other frames in the sync-layer and yet has a poorer quality than the preceding frames.

An improvement sequence begins at frame S(n) and continues for an encoder-determined number of frames, subsequent to keyframe S(n), until frame S(n+4). A receiver capable of performing the improvement techniques (referred to as an "enabled" receiver or decoder) generates an improvement frame I(n) based on a frame in the sync-layer, e.g., S(n−1), prior to the keyframe S(n). Similarly, improvement frames I(n+1), I(n+2), I(n+3) and I(n+4) are generated from the frame S(n−1) as shown at reference numerals 60(0), 60(1), 60(2), 60(3) and 60(4). Then, the display layer is generated from the improvement layer frames and the sync-layer frames, e.g., using a combination as indicated by the addition "+" indicators in FIG. 3. As shown by the shading of the display frames D(n), D(n+1), D(n+2), D(n+3), D(n+4) and D(n+5), the display frames eventually converge to the sync-layer frames, such that D(n+5) is identical to S(n+5).

In the example of FIG. 3, the encoder encodes keyframe S(n) to include a normal keyframe that all receivers (enabled receivers and non-enabled receivers) can decode. In addition, however, the encoder encodes, using a pre-keyframe video frame as a reference, e.g., frame S(n−1), supplemental information that enabled receivers can understand, to generate improvement frame I(n). The supplemental information (the aforementioned improvement data) is supplemental syntax shown at reference numeral 70(0) sent with keyframe S(n) that enabled receivers use to generate improvement frame I(n) based on frame S(n−1) using motion vectors, residuals, etc. for example. Thus, keyframe S(n) has the normal coding syntax to complete the keyframe, plus the syntax informing decoders (enabled receivers) how to form improvement frame I(n) and how to combine improvement frame I(n) with keyframe S(n) to generate display frame D(n). As an example, the supplemental syntax for the supplemental information to instruct the decoder how to build the improvement frame I(n) may be contained in Supplemental Enhancement Information (of the H.264 video codec standard), in which proprietary user messages may be used to define syntax to perform any of a variety of functions, including the syntax to build improvement frames as described herein. In addition, a flag may be included on a per-block basis of the frame to indicate whether the decoder should just use the normal keyframe data, or whether there is some new information that is to be displayed and thus the decoder should use the special syntax for the block to display that new information.

Supplemental syntax is sent with the encoder-determined number of frames subsequent the keyframe, e.g., frames S(n+1), S(n+2), S(n+3) and S(n+4), to allow an enabled decoder to generate improvement frames I(n+1), I(n+2), I(n+3) and I(n+4) from pre-keyframe S(n−1), and the supplemental syntax may respectively specify how to combine the improvement frames I(n+1), I(n+2), I(n+3) and I(n+4) with corresponding sync-layer frames S(n+1), S(n+2), S(n+3) and S(n+4) to generate display frames D(n+1), D(n+2), D(n+3) and D(n+4). Thus, as shown in FIG. 3, keyframe frame S(n) includes supplemental syntax 10(0) as described above, and the encoder-determined number of frames, e.g., S(n+1), S(n+2), S(n+3) and S(n+4) subsequent keyframe S(n), will each include the normal data that they would otherwise normally include, plus respective supplemental syntax describing how to generate a corresponding improvement frame with respect to/using the pre-keyframe S(n−1). The supplemental syntax for the post-keyframe frames S(n+1), S(n+2), S(n+3) and S(n+4) in the improvement sequence is shown at reference numerals 70(1), 70(2), 70(3), and 70(4), respectively. Thus, the additional syntax for keyframe S(n) will be different from the additional syntax for frame S(n+1), which will be different from the additional syntax for frame S(n+2), and so on, for the encoder-determined number of frames subsequent the keyframe. The supplemental syntax added for each of the encoder-determined number of frames subsequent to the keyframe cause enabled decoders to generate an "alternate" version of the frame, denoted as improvement frames, by reference to the specified pre-keyframe video frame.

During the encoding process, the encoder will perform the same process of generating improvement frames from a pre-keyframe frame as the decoder ultimately will, and in so doing, the encoder will determine how many frames, beyond the keyframe, will include the additional syntax before sufficient converging occurs between a sync-layer frame and a display layer frame. In the example of FIG. 3, frame S(n+4) is the last frame in the improvement sequence, and frames S(n+5) and S(n+6) do not have any supplemental syntax.

In FIG. 3, and as described above, "enabled receivers or decoders" are those receivers or decoders that are capable of interpreting the special syntax in a keyframe to generate improvement data from one or more video frames prior to a keyframe. By contrast, "non-enabled receivers or decoders are those receivers or decoders that are not capable of interpreting the syntax in keyframe to generate improvement data from one or more video frames prior to a keyframe. For example, the "improvement process" may be combined with an existing base video compression method, and those receivers that only support the base video compression method "are non-enabled" for improvement. There are also receivers that support the mechanism of improvement, but did not receive the earlier frame(s) on which the improvement is based and these receivers are referred to as unqualified receivers or decodes. An otherwise enabled receiver or decoder may not be "qualified" to perform the improvement using pre-keyframe content because, at a given point in time when the keyframe was received, it did not have a pre-keyframe frame that passed the aforementioned checksum test.

There are several types of improvements that may be employed. One is to simply perform motion compensation from a specified reference (with no residuals). Another is to blend the improvement data with the sync-layer data (the bitstream) and conceal any motion-compensated discontinuities. Motion-compensation can be applied to conceal the keyframe for display, using motion vectors relative to a previous reference frame to generate an out-of-loop improvement layer. In this way, receivers with continuity can improve the displayed image, while keeping the decoder state consistent in all receivers, including those that did not have access to a correct previous (pre-keyframe) frame.

Still another variation is to generate a correction layer. The correction layer involves improvement frames also being dependent on other prior improvement frames, rather than being dependent only on pre-keyframe base-layer frames. Thus, as shown by the dashed arrow from frame I(n+1) to frame I(n), at reference numeral 80 in FIG. 3, for example, improvement frame I(n+1) may be dependent on frame I(n) using any of the techniques described herein relative to frame I(n) as a reference. This can apply to subsequent improvement frames I(n), I(n+1) and I(n+2), I(n+3) and so on, which may be derived relative to one or more of their prior improvement frames.

Improvement Layer Examples

The improvement layer frame, imp(n+i), could be formed from or using any of the several techniques.

i) Syntax describing "improvement data" which can be used to generate the imp(n+i) from a prior decoded frame in the sync-layer, sync(n−k).

ii) Improvement data that describes motion compensation from sync(n−k), i.e. the improvement data consists of motion vectors applicable to small regions of the coded frame, e.g. macroblocks or coding units, on a similar basis to sync-layer motion compensation for the video codec in use.

iii) Improvement data includes a new block type of "not improved", meaning that it is transparent, and the display layer for that region will be taken from the sync-layer frame only.

iv) Methods to blend between layers (e.g., a linear combination as described above) and at boundaries, wherever one layer is not used (iii above). This may be useful at a boundary between inter- and intra-predicted blocks, and consequently, this can reasonably well addressed by conventional deblocking techniques (i.e. whatever is native to the rules of the codec).

v) Modification of decoded picture buffer behavior at decoder refresh to not invalidate all reference frames, but to move an identified frame or frames to the long-term reference picture buffer, and ongoing encoder management of that buffer until the improvement process is completed.

vi) Decoder-side qualification for generation and use of the display layer. This is based on an encoder-calculated checksum for the reference frame on which the improvement frames are to be based, and sent with the improvement data. The corresponding checksum is calculated in the decoder for the reference frame indicated by the improvement data, and if they match, display data dependent on this reference frame, via the improvement layer frame, is valid for use.

vii) Indications in the improvement data for the weighting of each improvement layer frame, and an indication of the point at which the improvement process is terminated and the display and sync-layers have converged. The process is then terminated, and base codec algorithms alone are used to generate displayed frames, until another keyframe occurs. More sophisticated temporal filtering algorithms could be applied to combine the two and other frames in the sequence, but weighted averaging may be a baseline.

viii) Modification of the decoder state model to include a keyframe_index in the bitstream, and retention of previous_keyframe_index. If a decoder receives a keyframe with an index that increments its keyframe_index, then it has stream continuity, and should consider the improvement-base checksums. If the keyframe index does not match a previous_keyframe_counter+1, it will only emit the sync stream. The previous_keyframe_index is updated by each received keyframe_index.

ix) Only sync-layer frames are retained in the encoder or decoder reference buffer. Display layer frames are emitted by the decoder, for display use only. The encoder is responsible for whether to generate the improvement data and how to apply the improvement data. There is a small increase in encoder computation to derive the improvement data, and an increase in decoder-side computation and bandwidth to form the improvement layer and combine with the sync-layer to form the display layer (but this is strictly transient).

As explained above, the additional information ("improvement data") provided from the encoder to the decoder to support the keyframe mitigation (for example, motion vectors for keyframes, frame checksums) can be conveyed in "supplemental enhancement information" (SEI) messages that extend existing coding standards, so that it can be used by receivers that understand (or have negotiated) these techniques, and ignored by other receivers.

Transmission of "improvement data" for motion could be omitted altogether. Instead, a suitable motion extrapolation algorithm can be applied at the decoder, to project the content of Frame(n−k) onto Frame(n+i) with appropriate motion (where that motion is determined only for receivers which have Frame(n−k) and similar frames before the keyframe).

Example Use Cases

Receiver re-sync: A receiver that is not in-sync (one that has requested resynchronization) should only use the "sync-layer" frame for display. If the improvement-base checksum as calculated by the decoder does not match, then that receiver may emit sync-layer frames until the next keyframe is sent.

Receiver join: Any receiver that was not receiving the stream previously (as determined by keyframe_index) will not have access to the reference frame on which the improvement data acts, and should not derive the display layer frames from this keyframe onwards.

Collateral keyframe: A receiver that passes the check on keyframe_index and did not request re-sync may verify that the pre-keyframe reference is valid (using checksums), and then use improvement data to derive an improvement layer frame that is combined with a sync-layer frame to produce a display-layer frame. The contribution of the improvement layer is diminished over a series of frames following the keyframe until sync and display layers are converged, as depicted in FIG. 3 and described above.

Keyframe on scene change: If the encoder determines that the encoded scene is substantially different, then it should not send the improvement data. Visual discontinuity will mask the quality of the keyframe.

Keyframe on partial content change: The encoder can determine that part of the frame is visually continuous, and apply improvement data for just that sub-frame region.

Keyframe on resolution change (with visual continuity): This would involve an additional algorithmic step, to scale the improvement layer frame before combination with the sync-layer frame. Where codecs have prescribed scaling algorithms, these may be applied to this step as well.

Even in broadcast and streaming video, keyframe size may be set such that there is still a qualitative difference between keyframes and adjacent frames, and the same techniques can be applied to achieve better visual continuity across group-of-pictures (GOP) boundaries that convey consistent visual content. Where periodic keyframes are encoded with such high quality that they are visibly imperceptible, the keyframes represent a significant increment on the compression cost of a group of pictures. If the improvement process described herein is used to achieve visual continuity through keyframes at GOP boundaries, there can be a worthwhile improvement in encoded bitrate.

Figure 4:
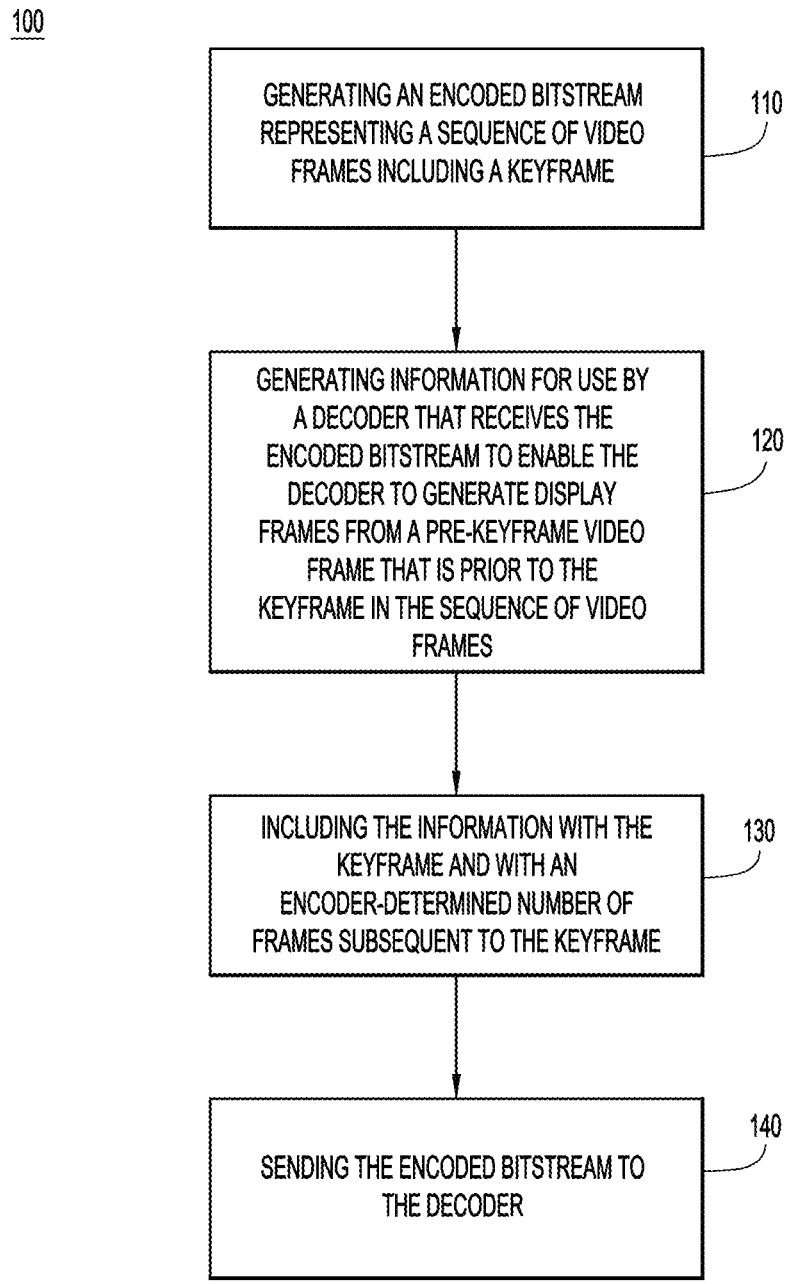
FIG. 4 is a flow chart depicting operations performed at a video encoder for the keyframe mitigation techniques, according to an example embodiment.

Reference is now made to FIG. 4. FIG. 4 shows a flow chart of operations of a process 100 performed at a video encoder, according to an example embodiment. At 110, an encoded bitstream is generated, the bitstream representing a sequence of video frames that includes a keyframe. At 120, information is generated that is for use by a decoder that receives the encoded bitstream. The information enables the decoder to generate display frames from a pre-keyframe video frame that is prior to the keyframe in the sequence of video frames. At 130, this information generated at 120 is included with the keyframe and with an encoder-determined number of frames subsequent to the keyframe. As explained above, the information in the keyframe (e.g., supplemental syntax) indicates whether and how the decoder is to generate an improvement frame from the pre-keyframe video frame. The information (supplemental syntax) may indicate a weighting to be made by the decoder in combining an improvement frame, generated by the decoder using the pre-keyframe video frame, with a decoded derived from the encoded bitstream. At 140, the encoded bitstream is sent to the decoder.

The encoder may signal to the decoder when and when not to use encoder-determined improvement data. For example, the encoder may determine whether a scene associated with the encoded bitstream has changed, and will not include the information (supplemental syntax) in the keyframe when it is determined that the scene associated with the encoded bitstream has changed. Conversely, the encoder may determine that a part of the keyframe is visually continuous with prior video frames, and if so, generates the information (supplemental syntax in the keyframe) to cause the decoder to use the pre-keyframe video frame to generate and apply improvement data for only a sub-frame region that is visually continuous with prior video frames. Furthermore, the encoder may include with a frame subsequent to the keyframe information (e.g., a checksum computed by the encoder from the pre-keyframe video frame) for comparison with a checksum computed from the pre-keyframe video frame by the decoder) to indicate to the decoder whether or not to generate improvement data from the pre-keyframe video frame.

Some useful variants of improvement data may be based around encoder-determined improvement data, examples of which are now described.

Motion compensation relative to one or more reference frames from before the keyframe (which are consistent in content with the original frame to be coded at the keyframe). This may be low in cost (transmitted bits), and can include usual methods of compression of prediction syntax, including differential motion vector expression relative to a predictor motion vector, and the use of skip blocks having identical motion to on one or more predictor motion vectors, as well as the use of variable block sizes for motion compensation.

Motion compensation as described above, plus limited use of residuals (for key blocks that cannot be well-represented from motion compensation alone). This may be limited in order to constrain the size of the improvement data.

Motion compensation as described above, plus residuals, plus optional intra coding, forming a conventional P-frame of good visual quality (at a higher frame cost in terms of transmitted bits).

Motion compensation with no residuals, but with de-blocking or other smoothing filter operations between blocks with divergent motion, to reduce visual discontinuities in the improvement data.

Motion compensation (supplemented either by limited or full use of residual data) to render an improvement frame, "punctured" in parts of the frame that are best represented by the co-located part of the actual base-layer keyframe (i.e. for those blocks display frames are equal to base/sync frames).

Punctured motion compensation as described above, but using blending at boundaries between regions that do and do not have improvement data.

These methods of forming improvement data for a series of improvement frames after the keyframe can be applied to:

One or more reference frames from before the keyframe;

As above for the first improvement frame I(n), and then improvement frame I(n+1) is derived from any of the above techniques applied relative to frame I(n) as a reference, to the improvement process only, and so on for subsequent improvement frames (the aforementioned "correction layer"); inter-frame reference at the base-layer unchanged.

Improvement frames can be combined with base (sync-layer) frames as:

A weighted combination for each frame D(n+k)=w(k)*I(n+k)+(1−w(k))*S(n), where weight w(k) is constant over the whole frame, and w(k) tends to zero over a finite number of frames following the keyframe.

A weighted combination where weight w(k) is specified at the sub-frame or block region, so that different emphasis between improvement and base frame can be applied in different regions of the display frame.

Figure 5:
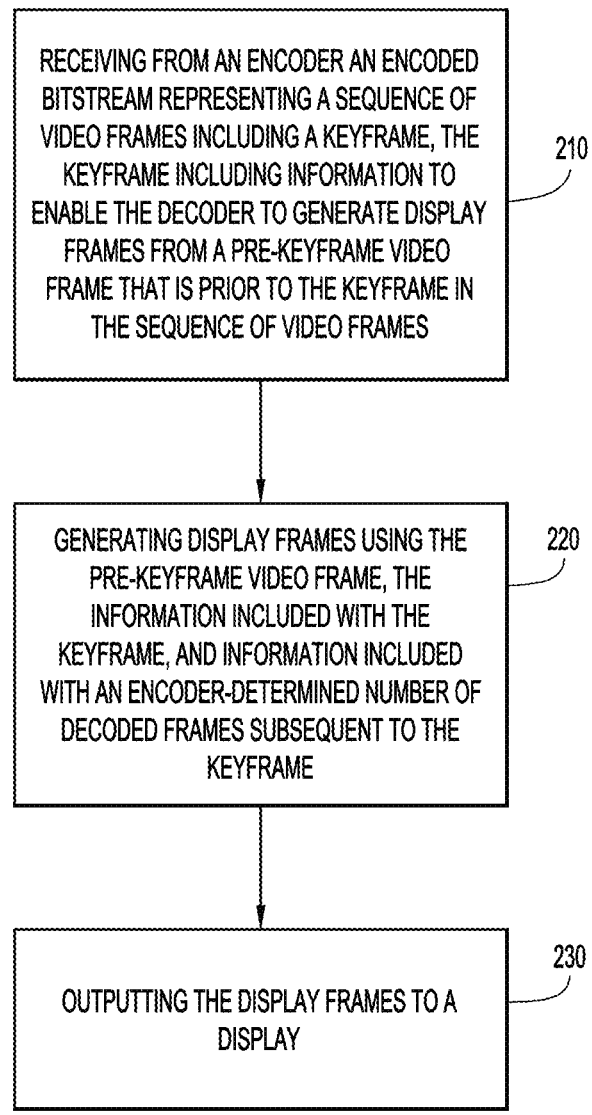
FIG. 5 is a flow chart depicting operations performed at a video decoder for the keyframe mitigation techniques, according to an example embodiment.

Reference is made to FIG. 5. FIG. 5 shows a flow chart of operations of a process 200 performed at a video decoder, according to an example embodiment. At 210, the video decoder receives from an encoder an encoded bitstream representing a sequence of video frames including a keyframe, the keyframe including information to enable the decoder to generate display frames from a pre-keyframe video frame that was received prior to the keyframe. At 220, the decoder generates display frames using the pre-keyframe video frame, the information (supplemental syntax) included with the keyframe, and information (supplemental syntax) included with an encoder-determined number of decoded frames subsequent to the keyframe. As described above, the decoder may generate display frames by generating one or more improvement frames based on the pre-keyframe video frames. At 230, the display frames are output to a display.

Display frames may be generated based on corresponding ones of the one or more improvement frames so as to conceal all or a part of the keyframe for display, and such that display frames take the place of the keyframe and subsequent frames for usage outside of decoding operations. A display frame may be generated based on an improvement frame generated for a position in the sequence and a decoded frame at a corresponding position in the sequence.

Further still, as described above, respective display frames may be generated based on a weighted combination of an improvement frame generated for a position in the sequence and a decoded frame at a corresponding position in the sequence. One or more improvement frames may be generated based on one or more motion vectors received in the bitstream and applied to the pre-keyframe video frame. Furthermore, a sequence one or more improvement frames may be generated for combination with the keyframe and one or more successive frames and applied to a point in the sequence that display frames derived from the bitstream are no longer improved by reference to the pre-keyframe video frame.

The information included with the keyframe may be supplemental syntax to the keyframe and the information included with each of the encoder-determined number of decoded frames may be supplemental syntax to the decoded frames.

As further described above, the decoder may determine whether or not to generate and output display frames generated from the pre-keyframe video frame. This determining may involve computing a checksum associated with the pre-keyframe video frame, and comparing the computed checksum with checksum information calculated at the encoder included in data sent by the encoder to the decoder subsequent to the keyframe, e.g., included with supplemental syntax of a frame subsequent to the keyframe. The decoder may generate display frames from the pre-keyframe video frame when the computed checksum matches the checksum information contained sent by the decoder, and otherwise, display frames are not generated from the pre-keyframe video frame.

Figure 6:
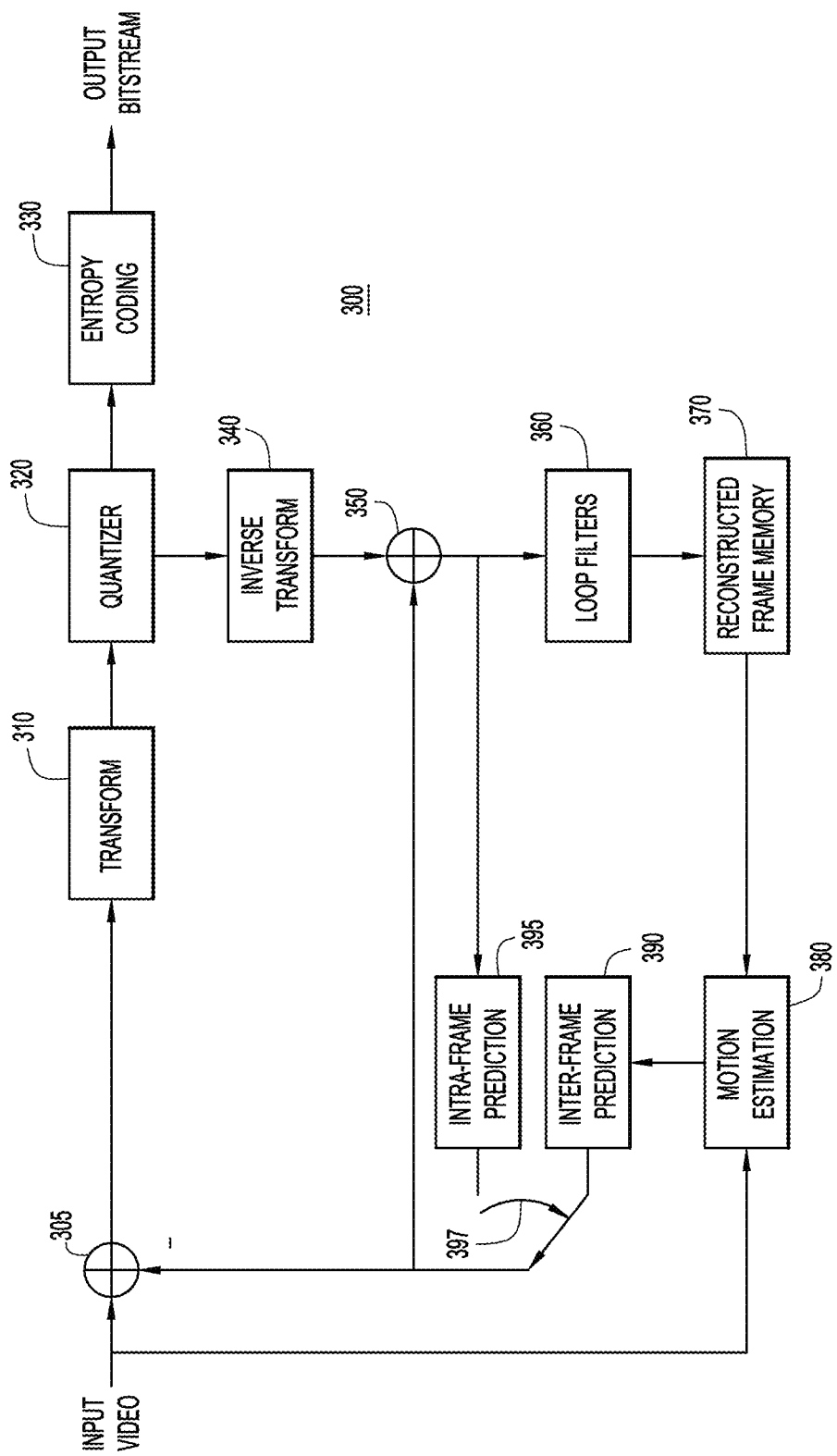
FIG. 6 is a block diagram of a video encoder configured to use the keyframe mitigation techniques presented herein, according to an example embodiment.

Referring first to FIG. 6 a block diagram of a video encoder is shown at reference numeral 300. The video encoder 300 is configured to perform the keyframe mitigation techniques presented herein. The video encoder 300 includes a subtractor 305, a transform unit 310, a quantizer unit 320, an entropy coding unit 330, an inverse transform unit 340, an adder 350, one or more loop filters 360, a reconstructed frame memory 370, a motion estimation unit 380, an inter-frame prediction unit 390, an intra-frame prediction unit 395 and a switch 397.

A current frame (input video) as well as a prediction frame are input to a subtractor 305. The subtractor 305 is provided with input from either the inter-frame prediction unit 390 or intra-frame prediction unit 395, the selection of which is controlled by switch 397. Intra-prediction processing is selected for finding similarities within the current image frame, and is thus referred to as "intra" prediction. Motion compensation has a temporal component and thus involves analysis between successive frames that is referred to as "inter" prediction. The motion estimation unit 380 supplies a motion estimation output as input to the inter-frame prediction unit 390. The motion estimation unit 380 receives as input the input video and an output of the reconstructed frame memory 370.

The subtractor 305 subtracts the output of the switch 397 from the pixels of the current frame, prior to being subjected to a two dimensional transform process by the transform unit 310 to produce transform coefficients. The transform coefficients are then subjected to quantization by quantizer unit 320 and then supplied to entropy coding unit 330. Entropy coding unit 330 applies entropy encoding in order to remove redundancies without losing information, and is referred to as a lossless encoding process. Subsequently, the encoded data is arranged in network packets via a packetizer (not shown), prior to be transmitted in an output bit stream.

The output of the quantizer unit 320 is also applied to the inverse transform unit 340 and used for assisting in prediction processing. The adder 350 adds the output of the inverse transform unit 340 and an output of the switch 397 (either the output of the inter-frame prediction unit 390 or the intra-frame prediction unit 395). The output of the adder 350 is supplied to the input of the intra-frame prediction unit 395 and to one or more loop filters 360 which suppress some of the sharpness in the edges to improve clarity and better support prediction processing. The output of the loop filters 360 is applied to a reconstructed frame memory 370 that holds the processed image pixel data in memory for use in subsequent motion processing by motion estimation block 380.

Figure 7:
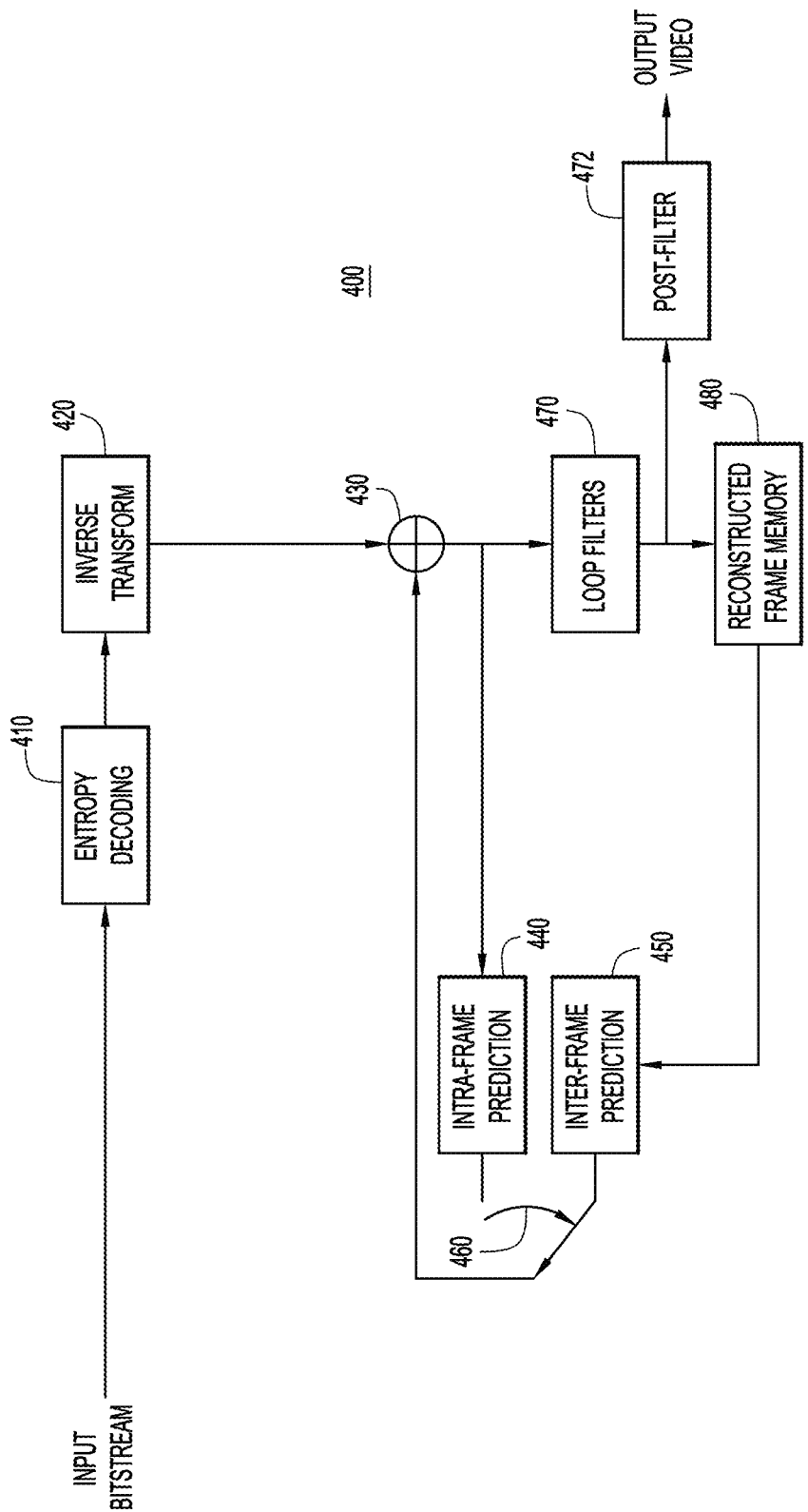
FIG. 7 is a block diagram of a video decoder configured to use the keyframe mitigation techniques presented herein, according to an example embodiment.

Turning to FIG. 7, a block diagram of a video decoder is shown at reference numeral 400. The video decoder 400 is configured to perform the generalized filter techniques presented herein. The video decoder 400 includes an entropy decoding unit 410, an inverse transform unit 420, an adder 430, an intra-frame prediction unit 440, an inter-frame prediction unit 450, a switch 460, one or more loop filters 470 and a reconstructed frame memory 480. A post-filter 472 is also shown in FIG. 7.

The entropy decoding unit 410 performs entropy decoding on the received input bitstream to produce quantized transform coefficients which are applied to the inverse transform unit 420. The inverse transform unit 420 applies two-dimensional inverse transformation on the quantized transform coefficients to output a quantized version of the difference samples. The output of the inverse transform unit 420 is applied to the adder 430. The adder 430 adds to the output of the inverse transform unit 420 an output of either the intra-frame prediction unit 440 or inter-frame prediction unit 450. An output video image is taken at the output of the loop filters 470.

The video encoder 300 of FIG. 6 and the video decoder 400 of FIG. 7 may be implemented by digital logic gates in an integrated circuit (e.g., by an application specific integrated circuit) or by two or more separate logic devices. Alternatively, the video encoder 300 and video decoder 400 may be implemented by software executed by one or more processors, as described further in connection with FIG. 8, below.

Each of the functional blocks in FIGS. 6 and 7 are executed for each coding block, prediction block, or transform block.

Figure 8:
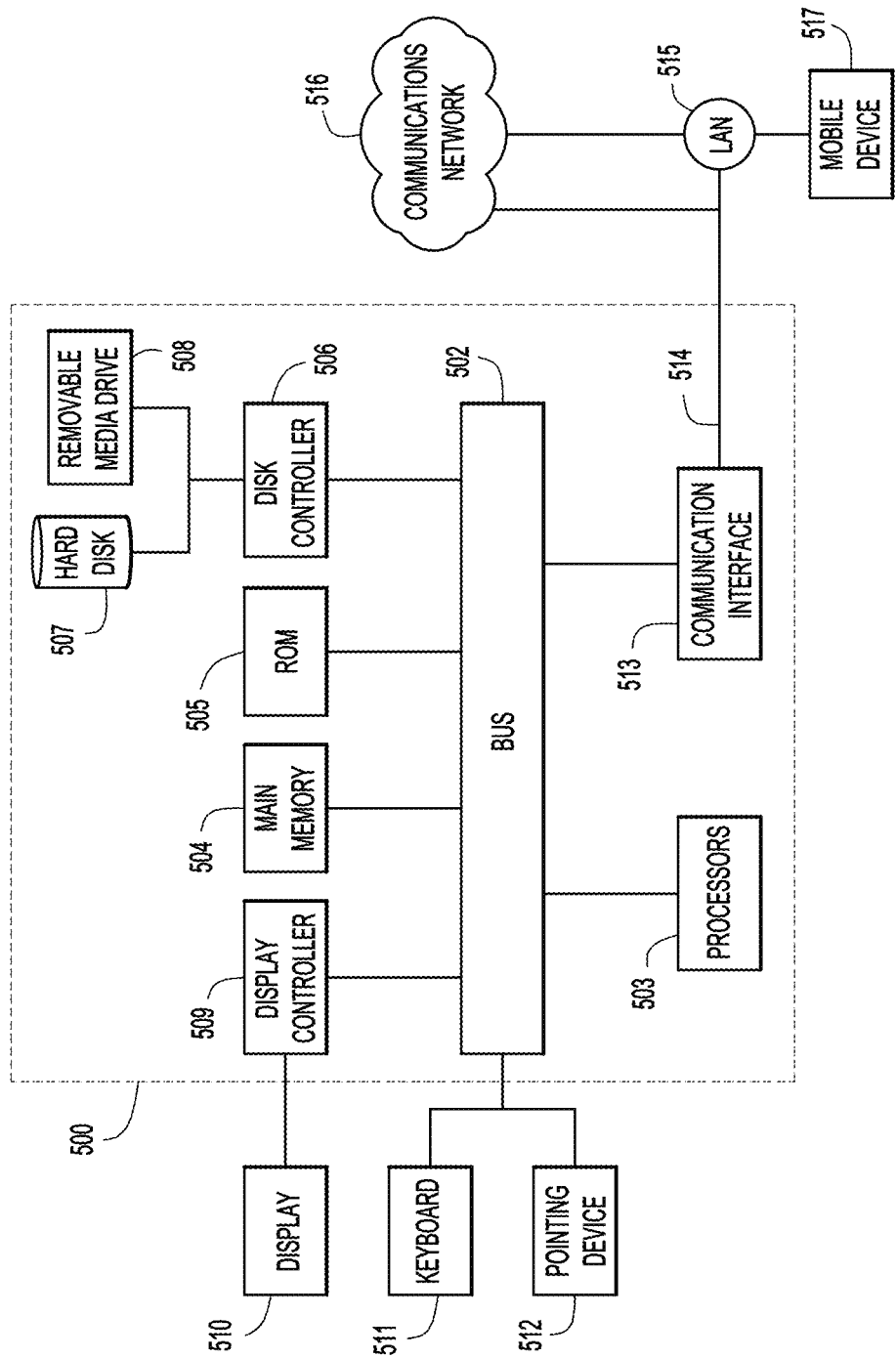
FIG. 8 is a block diagram of a computing system or apparatus in which the video encoding and/or video decoding operations may be performed, according to an example embodiment.

FIG. 8 illustrates a computer system 500 upon which an embodiment may be implemented. The computer system 500 may be programmed to implement a computer based device, such as a video conferencing endpoint or any device includes that a video encoder or decoder for processing real time video images, and configured to perform the operations described herein with reference to FIGS. 1-7. The computer system 500 includes a bus 502 or other communication mechanism for communicating information, and a processor 503 coupled with the bus 502 for processing the information. While the figure shows a signal block 503 for a processor, it should be understood that the processors 503 represent a plurality of processing cores, each of which can perform separate processing. The computer system 1201 also includes a main memory 504, such as a random access memory (RAM) or other dynamic storage device (e.g., dynamic RAM (DRAM), static RAM (SRAM), and synchronous DRAM (SD RAM)), coupled to the bus 502 for storing information and instructions to be executed by processor 503. In addition, the main memory 504 may be used for storing temporary variables or other intermediate information during the execution of instructions by the processor 503.

The computer system 500 further includes a read only memory (ROM) 505 or other static storage device (e.g., programmable ROM (PROM), erasable PROM (EPROM), and electrically erasable PROM (EEPROM)) coupled to the bus 502 for storing static information and instructions for the processor 503.

The computer system 500 may also include a disk controller 506 coupled to the bus 502 to control one or more storage devices for storing information and instructions, such as a magnetic hard disk 507 or solid state storage media, and a removable media drive 508 (e.g., floppy disk drive, read-only compact disc drive, read/write compact disc drive, compact disc jukebox, tape drive, and removable magneto-optical drive). The storage devices may be added to the computer system 500 using an appropriate device interface (e.g., small computer system interface (SCSI), integrated device electronics (IDE), enhanced-IDE (E-IDE), direct memory access (DMA), or ultra-DMA).

The computer system 500 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 500 may also include a display controller 509 coupled to the bus 502 to control a display 510, such as a cathode ray tube (CRT), liquid crystal display (LCD), light emitting diode (LED) display or any other display technology now known or hereinafter developed, for displaying information to a computer user. The computer system 500 includes input devices, such as a keyboard 511 and a pointing device 512, for interacting with a computer user and providing information to the processor 503. The pointing device 512, for example, may be a mouse, a trackball, or a pointing stick for communicating direction information and command selections to the processor 503 and for controlling cursor movement on the display 510. In addition, a printer may provide printed listings of data stored and/or generated by the computer system 500.

The computer system 500 performs a portion or all of the processing steps in response to the processor 503 executing one or more sequences of one or more instructions contained in a memory, such as the main memory 504. Such instructions may be read into the main memory 504 from another computer readable medium, such as a hard disk 507 or a removable media drive 508. One or more processors in a multi-processing arrangement may also be employed to execute the sequences of instructions contained in main memory 504. In alternative embodiments, hard-wired circuitry may be used in place of or in combination with software instructions. Thus, embodiments are not limited to any specific combination of hardware circuitry and software.

As stated above, the computer system 500 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 500, for driving a device or devices for implementing the techniques presented herein, and for enabling the computer system 500 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 1201 also includes a communication interface 513 coupled to the bus 502. The communication interface 513 provides a two-way data communication coupling to a network link 1214 that is connected to, for example, a local area network (LAN) 515, or to another communications network 516 such as the Internet. For example, the communication interface 513 may be a wired or wireless network interface card to attach to any packet switched (wired or wireless) LAN. As another example, the communication interface 513 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 513 sends and receives electrical, electromagnetic or optical signals that carry digital data streams representing various types of information.

The network link 514 typically provides data communication through one or more networks to other data devices. For example, the network link 514 may provide a connection to another computer through a local are network 515 (e.g., a LAN) or through equipment operated by a service provider, which provides communication services through a communications network 516. The local network 514 and the communications network 516 use, for example, electrical, electromagnetic, or optical signals that carry digital data streams, and the associated physical layer (e.g., CAT 5 cable, coaxial cable, optical fiber, etc.). The signals through the various networks and the signals on the network link 514 and through the communication interface 513, which carry the digital data to and from the computer system 500 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 500 can transmit and receive data, including program code, through the network(s) 515 and 516, the network link 514 and the communication interface 513. Moreover, the network link 514 may provide a connection through a LAN 515 to a mobile device 517 such as a personal digital assistant (PDA) laptop computer, or cellular telephone.

In summary, keyframes re-set the received bitstream, and make no reference to earlier frames, greatly restricting the available compression tools. In low-latency video communication over bandwidth-limited channels, keyframe size is constrained to avoid introducing latency, and so keyframes are of substantially lower visual quality. In switched video communication, any one receiver may request a keyframe to re-sync the video after packet loss, but all receivers will receive the sent keyframe and its lower quality. When a receiver has an unimpaired (by loss) view of the same scene before and after the keyframe, information from frames before the keyframe can be used to enhance the displayed visual quality instead of the sub-average quality keyframe itself. These techniques use information from earlier frames, with methods as are used in ordinary inter-frame coding. This is superior to sharpening or filtering the keyframe in isolation.

Using these techniques, rather than just displaying the keyframe specified by the underlying coding methods, which is often constrained to poor quality in low-latency use-cases, better video quality in a shared video stream can be achieved when keyframes are injected to allow join or re-sync for the benefit of other receivers. The method can be used as an extension to existing standards, and the display enhancement can be used by "enabled" receivers, and ignored by "non-enabled" receivers.

The techniques presented herein can be applied as a supplement to existing video coding methods, since they build upon them, and applied in a context that is currently prohibited, through simple extensions (checksum-gating and weighted combination of sync and improvement frames) that is outside the conventional decoding loop, that is, for display only.

In one form, a method is provided comprising: at a video decoder, receiving from an encoder an encoded bitstream representing a sequence of video frames including a keyframe, the keyframe including information to enable the decoder to generate display frames from a pre-keyframe video frame that was received prior to the keyframe; and generating display frames using the pre-keyframe video frame, the information included with the keyframe, and information included with an encoder-determined number of decoded frames subsequent to the keyframe.

In another form, a method is provided comprising: at a video encoder, generating an encoded bitstream representing a sequence of video frames including a keyframe; generating information for use by a decoder that receives the encoded bitstream to enable the decoder to generate display frames from a pre-keyframe video frame that is prior to the keyframe in the sequence of video frames; and including the information with the keyframe and with an encoder-determined number of frames subsequent to the keyframe.

In another form, an apparatus is provided comprising: a communication interface configured to enable communications over a network; a processor coupled to the network interface unit, and configured to: receive, via the communication interface, from an encoder an encoded bitstream representing a sequence of video frames including a keyframe, the keyframe including information to enable the processor to generate display frames from a pre-keyframe video frame that was received prior to the keyframe in the sequence of video frames; and generate display frames using the pre-keyframe video frame, the information included with the keyframe, and information included with an encoder-determined number of decoded frames.

In still another form, an apparatus is provided comprising: a communication interface configured to enable communications over a network; a processor coupled to the network interface unit, and configured to: generate an encoded bitstream representing a sequence of video frames including a keyframe; generating information for use by a decoder that receives the encoded bitstream to enable the decoder to generate display frames from a pre-keyframe video frame that is prior to the keyframe in the sequence of video frames; include the information with the keyframe and with an encoder-determined number of frames subsequent the keyframe; and cause the encoded bitstream to be sent to the decoder.

In yet another form, one or more non-transitory computer readable storage media are encoded with instructions, that when executed by a processor, cause the processor to perform operations including: generating an encoded bitstream representing a sequence of video frames including a keyframe; generating information for use by a decoder that receives the encoded bitstream to enable the decoder to generate display frames from a pre-keyframe video frame that is prior to the keyframe in the sequence of video frames; and including the information with the keyframe and with an encoder-determined number of frames subsequent to the keyframe.

In still another form, one or more non-transitory computer readable storage media are encoded with instructions, that when executed by a processor, cause the processor to perform operations including: receiving from an encoder an encoded bitstream representing a sequence of video frames including a keyframe, the keyframe including information to enable the decoder to generate display frames from a pre-keyframe video frame that was received prior to the keyframe; and generating display frames using the pre-keyframe video frame, the information included with the keyframe, and information included with an encoder-determined number of decoded frames subsequent to the keyframe.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    at a video decoder, receiving from an encoder an encoded bitstream representing a sequence of video frames, the sequence of video frames including a keyframe and at least one pre-keyframe video frame received prior to the keyframe in the sequence of video frames, wherein the keyframe includes supplemental syntax to enable the decoder to generate display frames based on the at least one pre-keyframe video frame that was received prior to the keyframe;
    generating one or more improvement frames based on the at least one pre-keyframe video frame using the supplemental syntax included with the keyframe; and
    generating a predetermined number of display frames subsequent to the keyframe, wherein each of the predetermined number of display frames is generated using a combination of an improvement frame from the one or more improvement frames and a decoded frame; and
    upon completion of generating the predetermined number of display frames, generating additional subsequent display frames using a decoded frame without an improvement frame.

2. The method of claim 1, wherein the predetermined number of display frames is determined by the encoder.

3. The method of claim 1, wherein generating each of the predetermined number of display frames comprises:
    generating a display frame based on an improvement frame generated for a position in the sequence of video frames and a decoded frame at a corresponding position in the sequence of video frames.

4. The method of claim 1, wherein generating each of the predetermined number of display frames is based on a weighted combination of an improvement frame and a decoded frame at a corresponding position in the sequence of video frames for each of the predetermined number of display frames.

5. The method of claim 1, wherein generating the one or more improvement frames is based on one or more motion vectors received in the encoded bitstream and applied to the pre-keyframe video frame.

6. The method of claim 1, wherein a sequence of the one or more improvement frames is generated for combination with the keyframe and one or more successive frames and applied to a point in the sequence that display frames derived from the encoded bitstream are no longer improved by reference to the pre-keyframe video frame.

7. The method of claim 4, wherein the supplemental syntax included with the keyframe indicates a weighting to be used for the weighted combination of the improvement frame and the decoded frame.

8. The method of claim 1, wherein a flag included with one or more blocks of the sequence of video frames indicates to the video decoder to use the supplemental syntax.

9. The method of claim 1, further comprising determining whether or not to generate and output display frames generated from the pre-keyframe video frame.

10. The method of claim 9, wherein determining comprises:
    computing a checksum associated with the pre-keyframe video frame;
    comparing the computed checksum with a checksum calculated at the encoder and included by the encoder in data sent by the encoder to the video decoder subsequent to the keyframe; and
    wherein generating comprises generating display frames using information from the pre-keyframe video frame when the computed checksum matches the checksum sent by the encoder, and otherwise, not generating display frames from the pre-keyframe video frame.

11. A method comprising:
- at a video encoder, generating an encoded bitstream representing a sequence of video frames including a keyframe, the sequence of video frames including a keyframe and at least one pre-keyframe video frame that is prior to the keyframe in the sequence of video frames;
- generating supplemental syntax for use by a decoder that receives the encoded bitstream to enable the decoder to generate display frames based on the at least one pre-keyframe video frame that is prior to the keyframe in the sequence of video frames, wherein the supplemental syntax enables the decoder to generate one or more improvement frames based on the at least one pre-keyframe video frame and enables the decoder to generate a predetermined number of display frames subsequent to the keyframe, wherein each of the predetermined number of display frames is generated by the decoder using a combination of an improvement frame from the one or more improvement frames and a decoded frame; and
- including the supplemental syntax with the keyframe and with an encoder-determined number of frames subsequent to the keyframe.

12. The method of claim 11, wherein the supplemental syntax indicates whether and how the decoder is to generate an improvement frame from the pre-keyframe video frame.

13. The method of claim 11, wherein the supplemental syntax indicates a weighting to be made by the decoder in combining the improvement frame, generated by the decoder using the pre-keyframe video frame, with the decoded frame derived from the encoded bitstream.

14. The method of claim 11, further comprising:
- determining whether a scene associated with the encoded bitstream has changed; and
- wherein including the supplemental syntax is not performed when it is determined that the scene associated with the encoded bitstream has changed.

15. The method of claim 11, further comprising:
- determining that a part of the keyframe is visually continuous with prior video frames;
- wherein the generating the supplemental syntax comprises generating the supplemental syntax to cause the decoder to use the pre-keyframe video frame to generate and apply improvement data for only a sub-frame region that is visually continuous with prior video frames.

16. The method of claim 11, wherein decoders that are capable of interpreting the supplemental syntax and decoders are not capable of interpreting the supplemental syntax can decode the keyframe and the encoder-determined number of decoded frames.

17. The method of claim 11, further comprising including in a video frame subsequent to the keyframe, information to indicate to the decoder whether or not to generate and output display frames generated from the pre-keyframe video frame.

18. The method of claim 17, wherein the information included in the video frame subsequent to the keyframe is a checksum computed by the encoder from the pre-keyframe video frame used for comparison with a checksum computed for the pre-keyframe video frame by the decoder.

19. An apparatus comprising:
- a communication interface configured to enable communications over a network;
- a processor coupled to the communication interface, and configured to:
  - receive, via the communication interface, from an encoder an encoded bitstream representing a sequence of video frames, the sequence of video frames including a keyframe and at least one pre-keyframe video frame received prior to the keyframe in the sequence of video frames, wherein the keyframe includes supplemental syntax to enable the processor to generate display frames based on the at least one pre-keyframe video frame that was received prior to the keyframe;
  - generate one or more improvement frames based on the at least one pre-keyframe video frame using the supplemental syntax included with the keyframe; and
  - generate a predetermined number of display frames subsequent to the keyframe, wherein each of the predetermined number of display frames is generated using a combination of an improvement frame from the one or more improvement frames and a decoded frame; and
  - upon completion of generating the predetermined number of display frames, generate additional subsequent display frames using a decoded frame without an improvement frame.

20. The apparatus of claim 19, wherein the processor is further configured to generate each of the predetermined number of display frames based on a weighted combination of an improvement frame and a decoded frame at a corresponding position in the sequence of video frames for each of the predetermined number of display frames.

* * * * *